Jan. 1, 1924. 1,479,537
J. C. GARNER
COTTON BREAKER AND SEPARATOR
Original Filed Feb. 3, 1920 3 Sheets-Sheet 1
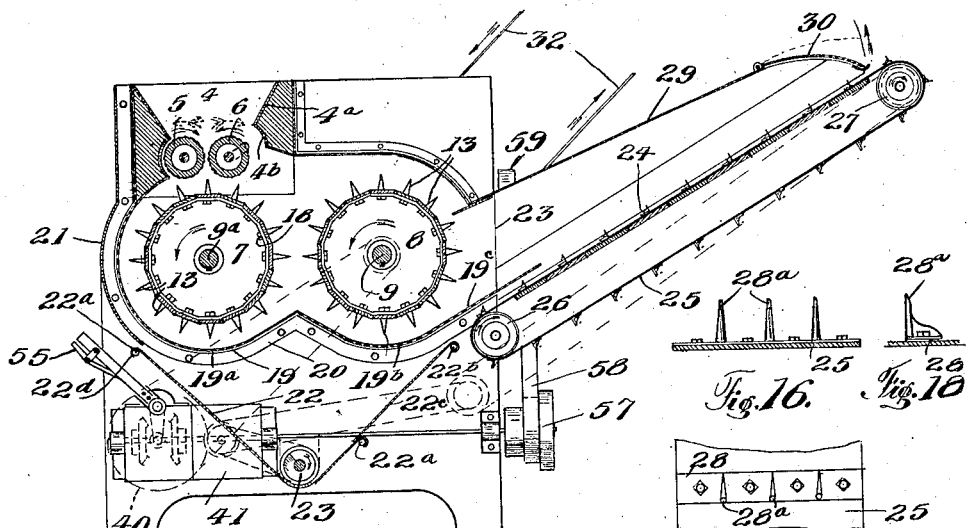
Fig. 2.
Fig. 16.
Fig. 10.
Fig. 17.
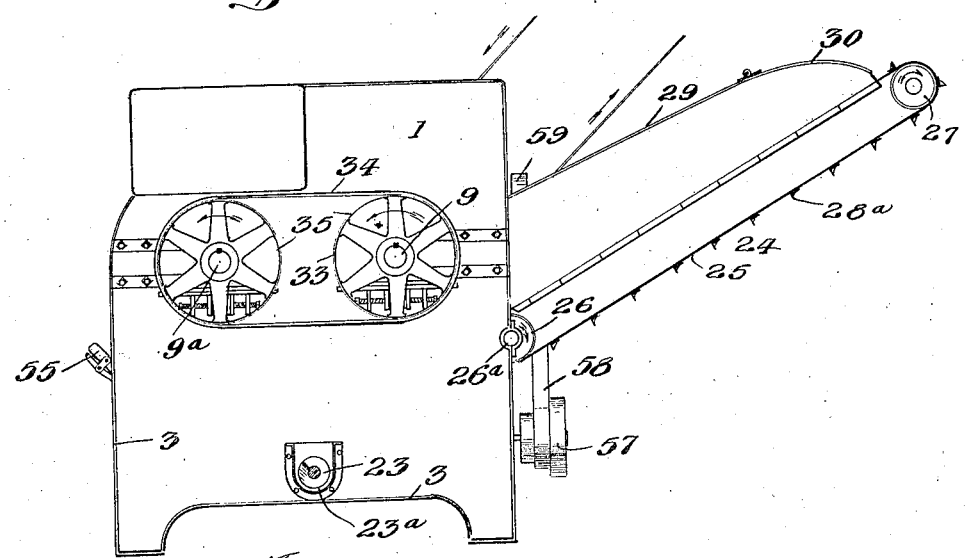
Fig. 1.
Witness
Howard L. Burns
Inventor
James Garner
By H. H. Bliss
Attorney

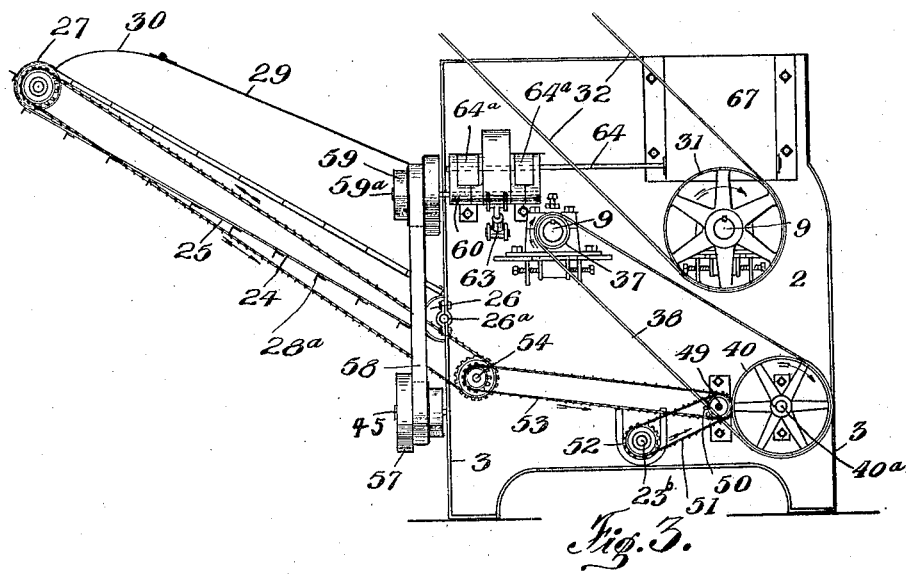
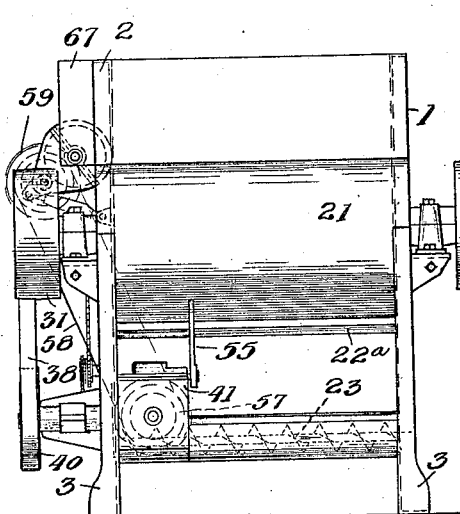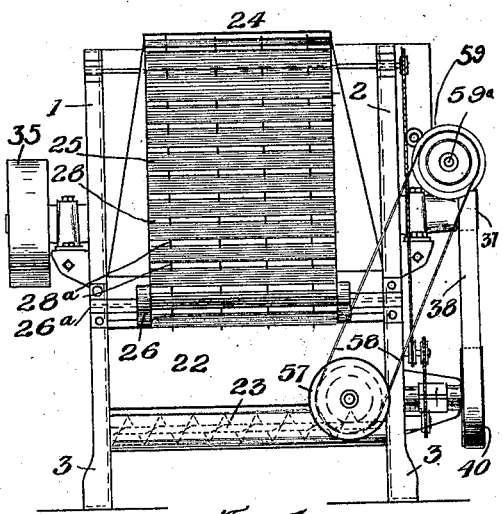

Jan. 1, 1924

J. C. GARNER

COTTON BREAKER AND SEPARATOR

Original Filed Feb. 3, 1920

Witness:-
Howard J Burns

Inventor:
James C Garner
By J H Blis
Attorney.

Patented Jan. 1, 1924.

1,479,537

UNITED STATES PATENT OFFICE.

JAMES C. GARNER, OF HOUSTON, TEXAS, ASSIGNOR, BY MESNE ASSIGNMENTS, TO THE GARNER GIN COMPANY, INC., OF HOUSTON, TEXAS, A CORPORATION OF TEXAS.

COTTON BREAKER AND SEPARATOR.

Application filed February 3, 1920, Serial No. 355,930. Renewed April 21, 1923.

*To all whom it may concern:*

Be it known that I, JAMES C. GARNER, a citizen of the United States, residing at Houston, in the county of Harris and State of Texas, have invented certain new and useful Improvements in Cotton Breakers and Separators, of which the following is a specification, reference being had therein to the accompanying drawing.

This invention relates to machines for renovating and cleaning cotton and other fibrous materials.

In the cotton industry there is a considerable amount of so-called low grade cotton, which, when placed upon the market, commands a relatively low price. This material comes from various sources. Many bales may, during one season or another, come from a territory where, because of storms, overflowing streams, or the like, the cotton, while growing, is seriously damaged, being beaten down to the earth, commingled with sand, earth or similar foreign materials. Again, large masses are shipped to market which have not been carefully manipulated at the farms, the bales containing not only the cotton fibres, but stalks, stems, leaves and similar trash. And again much cotton is gathered up at ginning houses and compress houses where it has become, either carelessly or unavoidably, detached from larger masses. Many masses are composed of cotton which is swept up from floors and is necessarily commingled with trash and dirt. At ware-houses, compress plants and at other points, samples are removed from the bales for the purpose of inspection and thrown aside.

And all these, when accumulated, amount to large quantities.

In any such case the cotton fibres themselves may be of good quality, the masses, however, being rated as of low grade because of the presence of foreign bodies, such as those specified, or because of the treatment that they have received at the field or other points.

It has been found that the fiber can be separated and cleaned or renovated so that the resultant products compare favorably with the cotton rated on the market as first grade. In carrying out the cleaning and renovating process to which the mechanism of the present invention relates, such cotton as has been compressed into bales and also that which has been accumulated in unbound condition from the sources mentioned, is first opened up, separated and fluffed, and it is then still further separated into individualized fibers, and, then finally condensed and again compressed. During the preliminary opening up and fluffing of the cotton, the coarser and heavier foreign particles are separated from it and in the subsequent treatment of the fibers the latter are more thoroughly cleaned and straightened out.

The present invention relates to the means employed in opening up and fluffing cotton masses, and partially cleaning them, and has for its object the provision of devices which will efficiently perform this work, and will be simple in construction and readily maintained in operation.

In the drawings:

Fig. 1 is an end view of the picker and cleaner.

Fig. 2 is a sectional view looking in the same direction as in Fig. 1.

Fig. 3 is an end view looking in the opposite direction from that in which Fig. 1 is seen.

Fig. 4 is a front view of the machine.

Fig. 5 is a rear view.

Fig. 16 is a cross section of the conveyor belt showing the flight bar mounted thereon.

Figs. 17 and 18 are plan and end views, respectively, of a flight bar such as shown in Fig. 16.

The mechanism as an entirety is supported by the walls 1 and 2 which are formed at their sides and bottoms with the strengthening flanges 3. These walls are secured to each other by several elements of the apparatus, such as shafts and housings for different parts, all of which give sufficient support to form a rigid structure.

Figure 6:
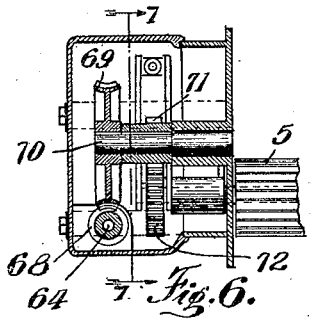
Fig. 6 shows the feeder roll driving mechanism.
Figure 7:
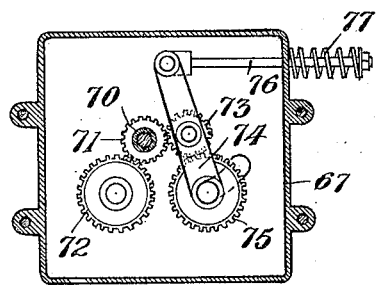
Fig. 7 is an end view of the feeder roll gears and the pressure spring lever, taken on the line 7, 7 of Fig. 6.
Figure 8:
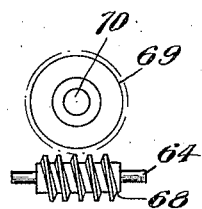
Fig. 8 shows the worm gear employed in driving the feeder rolls.
Figure 9:
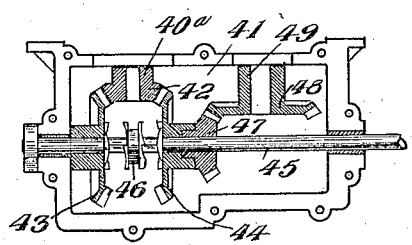
Fig. 9 shows the transmission drive for the rolls.
Figure 10:
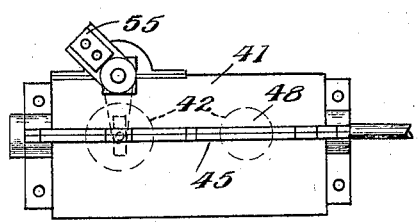
Fig. 10 shows the housing for the drive mechanism shown in Fig. 9.
Figure 11:
Fig. 11 is a detail of one of the parts of the transmission mechanism.

In the upper part of this structure a hopper is provided at 4, the sides of which can be extended upward, if desired, and into this the material is initially delivered. In the lower part of the mouth of the hopper are feed rolls 5 and 6. These feed rolls are preferably fluted longitudinally of their surface, as shown in Fig. 6, to insure a gripping effect on the material fed to them from the hopper. The devices by which these rolls are mounted and actuated will be described below.

Figures 12, 13, 14:
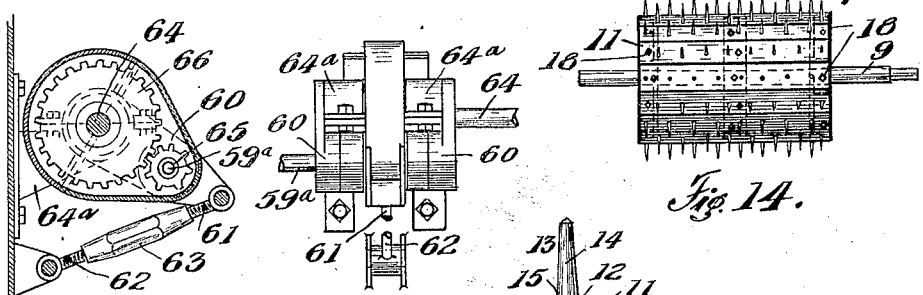
Fig. 12 shows the belt tensioning device for the feeder roll drive.
Fig. 13 is a view of the mounting and casing for the mechanism shown in Fig. 12.
Fig. 14 shows one of the picker drums assembled.
Figure 15:
Fig. 15 is an enlarged view of one of the picker teeth showing its construction and method of mounting.

Immediately below the feed rolls is a picker drum 7. Another picker drum 8 is positioned parallel to and at one side of the drum 7. The component elements of each of the drums are carried by shafts 9 and 9ª (see Fig. 14) mounted in suitable bearings supported on the walls 1 and 2. To this shaft are rigidly secured two or more polygonal spiders, in this case three, and to these are bolted the flat bars 11. These bars 11 are provided with a series of apertures 12, 12 into which are fitted the picker teeth or spikes 13. Each of these spikes has a tapered part 14, a shoulder 15 and a threaded shank 16. The shanks of the spikes are fitted in the apertures 12 of the bars 11 and are tightly held in place by the nuts 17. The bars are then positioned on the polygonal spiders and bolted thereto as at 18. The spikes in one bar are staggered in relation to those in other bars so that the points, when the drum is rotated, describe approximately a solid cylinder.

Below the picker drums 7 and 8 is a screen 19, preferably a heavy wire screen of large mesh. It extends across the mechanism and is supported at either side by the curved angle brackets 20, 20. It is in two parts 19ª, 19ᵇ each approximately concentric with a drum, the part 19ª extending around considerably more than half of the drum 7, and the part 19ᵇ around the lower part of the drum 8, the latter part terminating in a flat delivery section 19ᶜ. Below the screen 19 is a trough 22, extending across the structure, and supported by the cross bars 22ª, 22ᵇ, and arranged to receive material passing through the screen. At the apex of the trough is a spiral conveyor 23 to carry the material which falls through the screen and is delivered to the bottom of the trough, to one end of the mechanism where it can be discharged into any suitable receptacle. To provide convenient access to the interior of the trough, one side is made in two sections, the upper one 22ᶜ being hinged on its supporting bar 22ᵇ and its lower edge overlapping the lower wall section.

To prevent any material, which may pass through the screen at points above the upper end 22ᵈ of the trough 22, from falling outside of the mechanism, a curved wall 21 is provided which delivers any particles that may pass through the screen to the trough 22.

The material at the bottom of the hopper 4 is firmly gripped by the feed rolls 5 and 6 rotating in the direction shown by the arrows, and as it is forced down from the contact line of the rolls, it is immediately presented to the teeth along a line parallel to the axis of the drum 7, and as these teeth move rapidly past the rolls they pick off small bunches of clumps of the fiber with the accompanying particles of foreign materials, and tear them open and more or less fluff up the fibrous matter. This releases the heavy foreign particles, such as sticks, bits of metal and earthy matter, and they drop on or are driven against the screen 19. They pass immediately through it and fall into the trough 22. But the bunches, or clumps, of fiber are carried around by the teeth 13 in the direction of the arrow (shown on the drum 7) until they are engaged by the teeth of the second picker drum 8. The teeth 13 being comparatively blunt, do not pierce the bunches of fibrous material but act to tear them away from the mass gripped by the feed rolls and carry them through the space adjacent the screen by a rapid digging action. During that part of the path travelled by the picker teeth between the feed rolls and the delivery end of the curved part 19ª of the screen 19, the fiber is dragged over the screen, which further helps to break up the tangled and matted clumps. As soon as the teeth have carried the bunches of fiber beyond the edge of the curved section 19ª of the screen, said bunches are thrown off the teeth of the picker drum 7 toward the oppositively moving teeth of the drum 8. This rapid reversal of the direction of travel of the fibers will further cause them to be fluffed and opened up, and affords another opportunity for the foreign bodies, still carried by the material, to be dropped on the screen. The fibers are now carried around by the drum 8 and then thrown out through the aperture 23 onto the belt conveyor 24. This delivers it to another conveyor or to a receptacle, as may be desired.

The conveyor 24 comprises the endless belt 25 carried around drums 26 and 27. The former is mounted in bearings 26ª secured to the walls 1 and 2, and the latter in bearings on a framework, not shown. Flight bars 28, each carrying a transverse series of flights 28ª, serve to positively engage with the material and carry it upward. A hood 29 prevents the bunches of fibers from dropping over the sides of the conveyor. A hinge door 30 at the end of the conveyor acts to flatten (more or less) the material carried by the upper end of the belt and compels the delivery of such material directly into the receptacle or hopper of the second conveyor, as the case may be.

The foreign particles separated from the fiber bunches by the picker teeth 13 and dropping from the screen are delivered to the spiral conveyor 23 and ultimately discharged at 23ª.

The devices by which power is transmitted to the machine and distributed to the several moving parts, are as follows:

The shaft 9 of the picker drum 8 is provided with a pulley 31 with which a main driving belt 32 engages. On the opposite end of the shaft 9 there is a pulley 33. 34 is a belt engaging therewith and also with a pulley 35 on the shaft 9ª of the drum 7. At the end of the shaft 9ª opposite to the pulley 35 there is another pulley 37 around which a belt 38 passes. This belt also engages with a pulley 40 mounted on a shaft 40ª. This shaft extends into a gear box 41 and carries a bevel wheel 42. The latter engages with two loose opposite bevels 43 and 44 on shaft 45. A clutch 46 can engage, at option, with either bevel 43 or 44. The bevel 44 is connected to a similar bevel 47 which, in turn, engages with and drives the bevel 48. The shaft 49 of the bevel 48 extends outward and carries a sprocket wheel 50 which, through chain 51, rotates the sprocket wheel 52 on the shaft 23ᵇ of the conveyor 23. A second chain 53 is driven from the shaft 48 and, in turn, drives the shaft 54 of the conveyor 24.

The clutch 46 is shifted by the lever 55 mounted on the gear box and accessible at the front of the machine. The feeder rolls 5 and 6 are driven at optionally variable speeds. The shaft 45 extends to the rear of the machine and carries a three-speed belt pulley 57. 58 is a belt extending upward to a three-speed pulley 59. This is on the end of a shaft 59ª which is mounted in a swinging bearing 60, the bearing being adjustable for the purpose of taking up slack in the belt 58, by turn buckle devices having the rods 61 and 62 pivoted, one to the machine frame, and the other to the bearing, together with the threaded adjustor 63. The bearing element 60 for the shaft 59ª swings around the axis of a shaft 64 mounted in bearings 64ª on the frame. 65 is a pinion on the shaft 59ª meshing with a gear 66 on the shaft 64. The shaft 64 extends toward the front of the machine and into the gear box 67. It carries a worm 68 which engages with a worm wheel 69 on a short shaft 70. This shaft also carries a spur gear 71 which meshes with a gear wheel 72 that is keyed to the shaft of the feed roll 5, and meshes also with an idler gear 73. 74 is a swinging bearing carrier pivoted on the axis of the idler gear 73, and at its lower end supporting the other feed roll 6, the latter having a pinion 75 meshing with the idler gear 73.

The swinging bearing carrier 74 is normally held in a predetermined position by a rod 76 and spring 77; but the spring permits the bearing and the feed roll 6 to yieldingly resist any pressure away from the feed roll 5 caused by the material which is passing between the rolls. The swinging roll 6, however, is always positively driven by the power. A swinging bearing (not shown) similar to the bearing 74 except that it has no gear mechanism, supports the feed roll 6 at the other end of the machine. A portion of the lower edge of the side 4ª of the hopper 4 is cut away as at 4ᵇ to permit this swinging motion of the feed roller 6.

The manner in which the machine is used will be readily understood from the foregoing. The masses of cotton, both those received in loose condition and those obtained from broken bales, are delivered to the hopper 4 more or less miscellaneously. The rolls grip the material and feed it downward. The teeth of the rapidly rotating drum beneath the rolls engage with the masses of fiber and tear them into comparatively small bunches, which they drag over the screen 19 and subject to the above described opening and fluffing action thereby releasing the foreign particles which are of such shapes that when they come to the screen, pass through it. After being subjected to such action of the first picker drum, they are delivered to the second picker drum and again engaged by the teeth of that drum and still further disintegrated and freed from the foreign bodies.

The variable speed mechanism for driving the feeder rolls is particularly advantageous when it is necessary to handle, at first, cotton which has been subjected to a comparatively high pressure and, then, to handle cotton which has been subjected to a lower pressure when baled. Cotton of the first sort must be fed more slowly to the picker drums as the cotton is in a more thoroughly tangled and matted condition than that of the latter sort which can be fed more rapidly.

Moreover, the mechanism described for reversing the feeder rolls permits the rolls to be relieved of any heavy masses or any object that may become wedged therebetween.

What I claim is:

1. In a mechanism for breaking and opening up compacted masses of cotton, the combination of variably speeded feed rolls adapted to grip, advance and temorarily hold such masses, a parti-cylindrical screen below the rolls, a hollow drum on an axis immediately below the gripping rolls and having a closed peripheral wall of long radius adjacent and parallel to said screen, and breaking and tearing teeth secured to said wall and crossing the space between the wall and the screen, a second drum having a closed peripheral wall and teeth similar to those aforesaid and adapted to move rapidly downward on lines adjacent the first drum, a second curved screen below the second drum, an elongated duct extending at an inclination upward and outward from the second drum, an apron conveyor at the bottom of said duct, and means for checking the cotton elevated by the said conveyor.

2. In a mechanism for breaking and opening up compacted masses of cotton, the combination of variably speeded feed rolls adapted to grip, advance and temporarily hold such masses, a parti-cylindrical screen below the rolls, a hollow drum on an axis immediately below the gripping rolls and having a closed peripheral wall of long radius adjacent and parallel to said screen, and breaking and tearing teeth secured to said wall and crossing the space between the wall and the screen, a second drum having a closed peripheral wall and teeth similar to those aforesaid and adapted to move rapidly downward on lines adjacent the first drum, a second curved screen below the second drum, an elongated duct extending outward from the second drum, an apron conveyor at the bottom of said duct, and means for checking the cotton elevated by the said conveyor.

In testimony whereof, I affix my signature.

JAMES C. GARNER.